(12) United States Patent
Benisty

(10) Patent No.: US 10,642,758 B2
(45) Date of Patent: May 5, 2020

(54) STORAGE DRIVE AND METHOD OF EXECUTING A COMPARE COMMAND

(71) Applicant: Western Digital Technologies, Inc., San Jose, CA (US)

(72) Inventor: Shay Benisty, Beer Sheva (IL)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 85 days.

(21) Appl. No.: 16/013,889

(22) Filed: Jun. 20, 2018

(65) Prior Publication Data
US 2019/0004975 A1 Jan. 3, 2019

Related U.S. Application Data

(60) Provisional application No. 62/525,884, filed on Jun. 28, 2017.

(51) Int. Cl.
*G06F 12/10* (2016.01)
*G06F 12/14* (2006.01)
*G06F 12/0806* (2016.01)
*G06F 12/02* (2006.01)

(52) U.S. Cl.
CPC ...... *G06F 12/1458* (2013.01); *G06F 12/0246* (2013.01); *G06F 12/0806* (2013.01); *G06F 2212/1052* (2013.01); *G06F 2212/7203* (2013.01)

(58) Field of Classification Search
CPC .................. G06F 12/1458; G06F 12/0246
USPC .......................................... 711/103
See application file for complete search history.

(56) References Cited

U.S. PATENT DOCUMENTS

2005/0036618 A1* 2/2005 Gammel .................. G06F 7/00
380/255

* cited by examiner

*Primary Examiner* — Jae U Yu
(74) *Attorney, Agent, or Firm* — Patterson & Sheridan, LLP; Steven Versteeg

(57) ABSTRACT

A data storage device includes a memory and a controller coupled to the memory. The controller is configured to receive a compare command from a host, fetch or generate protection information from the host, fetch protection information from the memory, compare the protection information from the host and from the memory, and post a failure notice to the host when the protection information from the host and from the memory do not match. If the protection information from the host and from the memory does match, the controller is further configured to compare data fetched from the host and data fetched from the memory, and post a success notice to the host when both the protection information from the host and the memory match and the data from the host and the memory match.

25 Claims, 6 Drawing Sheets

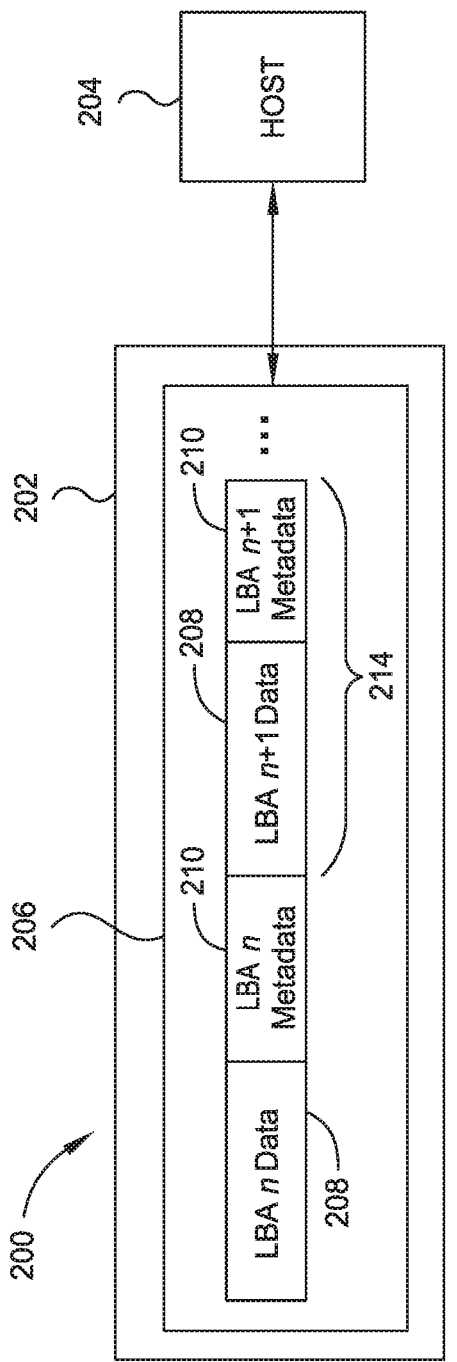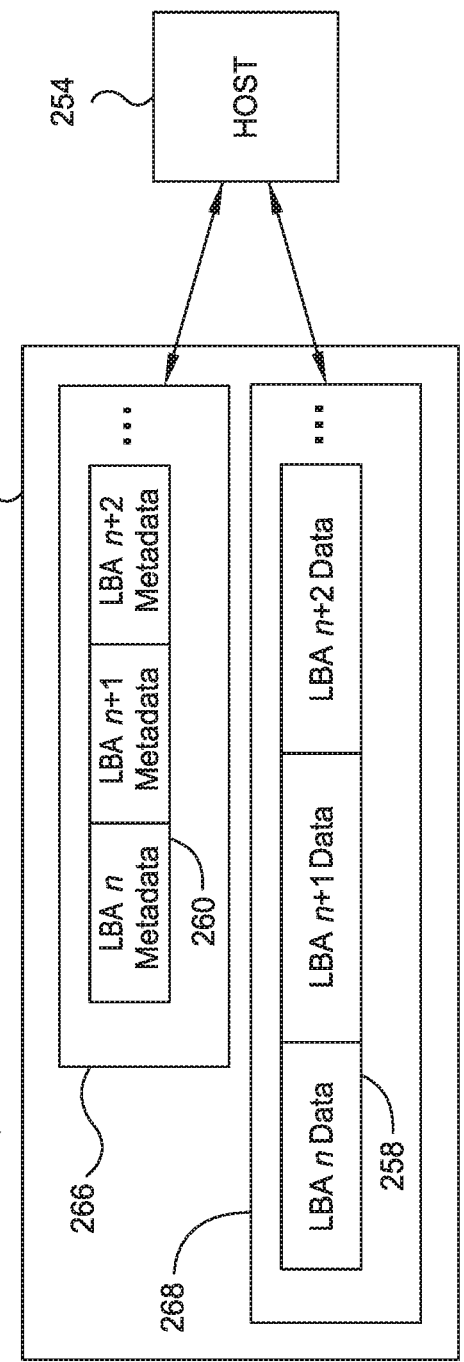

PROTECTION INFORMATION IN FIRST 8B OF METADATA

PROTECTION INFORMATION IN LAST 8B OF METADATA

STORAGE DRIVE AND METHOD OF EXECUTING A COMPARE COMMAND

CROSS-REFERENCE TO RELATED APPLICATIONS

This application claims benefit of U.S. Provisional Patent Application Ser. No. 62/525,884, filed Jun. 28, 2017, which is herein incorporated by reference.

BACKGROUND OF THE DISCLOSURE

Field of the Disclosure

Embodiments of the present disclosure generally relate to a storage drive and method of executing a compare command.

Description of the Related Art

NVM Express (NVMe) is an interface protocol for a host device and a data storage device, such as a solid state drive (SSD), based on a paired submission and completion queue mechanism. Commands are placed by host software into a submission queue. Completions are placed into a completion queue by a controller of the data storage device. Submission and completion queues are allocated in a memory of the host device.

A compare command is one of the command sets in the NVMe protocol. When getting a compare command, the data storage device reads specified data for a logical operation address or addresses from a storage medium of the data storage device, and compares the data from the data storage device to data transferred from the host device as part of the command. If the data read from the data storage device and data received from the host device are equivalent with no miss-compares, then the compare command completes with a compare success posted to the completion queue. If there are any miss-compares, the compare command completes with a compare failure posted to the completion queue.

One issue facing host devices and data storage devices operating under the NVMe protocol is the length of the execution time of the compare command. Therefore, there is a need for an improved storage drive and method of executing a compare command, such as a compare command under the NVMe protocol.

SUMMARY OF THE DISCLOSURE

A data storage device includes a memory and a controller coupled to the memory. The controller is configured to receive a compare command from a host, fetch or generate protection information from the host, fetch protection information from the memory, compare the protection information from the host and from the memory, and post a failure notice to the host when the protection information from the host and from the memory do not match. If the protection information from the host and from the memory does match, the controller is further configured to compare data fetched from the host and data fetched from the memory, and post a success notice to the host when both the protection information from the host and the memory match and the data from the host and the memory match.

In one embodiment, a data storage device comprises a memory comprising a non-volatile memory and one or more cache buffers, and a controller coupled to the memory. The controller is configured to receive a compare command from a host, fetch protection information from the host, fetch protection information from the memory, compare the protection information from the host and the protection information from the memory, and post a failure notice to the host when the protection information from the host and the protection information from the memory do not match.

In another embodiment, a data storage device comprises a memory comprising a non-volatile memory and a cache buffer, and a controller coupled to the memory. The controller is configured to receive a compare command from a host, compare protection information received from the host and protection information received from the memory, determine that the protection information received from the host and the protection information received from the memory match, and post a success notice to the host.

In one embodiment, a method of operating a data storage device comprises fetching protection formation from a memory of the data storage device, fetching data from a host, and generating protection information based on the data fetched from the host. The method further comprises comparing the generated protection information and the fetched protection information, and posting a failure notice to the host when the generated protection information and the fetched protection information do not match.

In another embodiment, a method of operating a data storage device comprises receiving a compare command, determining protection information is enabled, fetching protection information from a host and from a memory in parallel, and comparing the protection information from the host and the protection information from the memory. The method further comprises fetching data from the host and from the memory in parallel, comparing the fetched data from the host to the fetched data from the memory, and posting a failure notice to the host when the protection information from the host and the protection information from the memory match, and the data from the host and the data from the memory do not match.

In another embodiment, a data storage device comprises a non-volatile memory, means for fetching protection information from the non-volatile memory, means for fetching protection information from a host, and means for calculating protection information based on data fetched from the host. The data storage device further comprises means for determining whether the protection information from the host and from the non-volatile memory match, and means for fetching data from the non-volatile memory when the protection information from the host and the protection information from the non-volatile memory are determined to match.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 2A-2B illustrate various embodiments of transferring metadata and LBA data between a data storage device and a host.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

A data storage device includes a memory and a controller coupled to the memory. The controller is configured to receive a compare command from a host, fetch or generate protection information from the host, fetch protection information from the memory, compare the protection information from the host and from the memory, and post a failure notice to the host when the protection information from the host and from the memory do not match. If the protection information from the host and from the memory does match, the controller is further configured to compare data fetched from the host and data fetched from the memory, and post a success notice to the host when both the protection information from the host and the memory match and the data from the host and the memory match.

Embodiments of the present disclosure generally relate to a data storage drive, such as a SSD, and method of executing a compare command, such as a compare command under the NVMe protocol.

Figure 1:
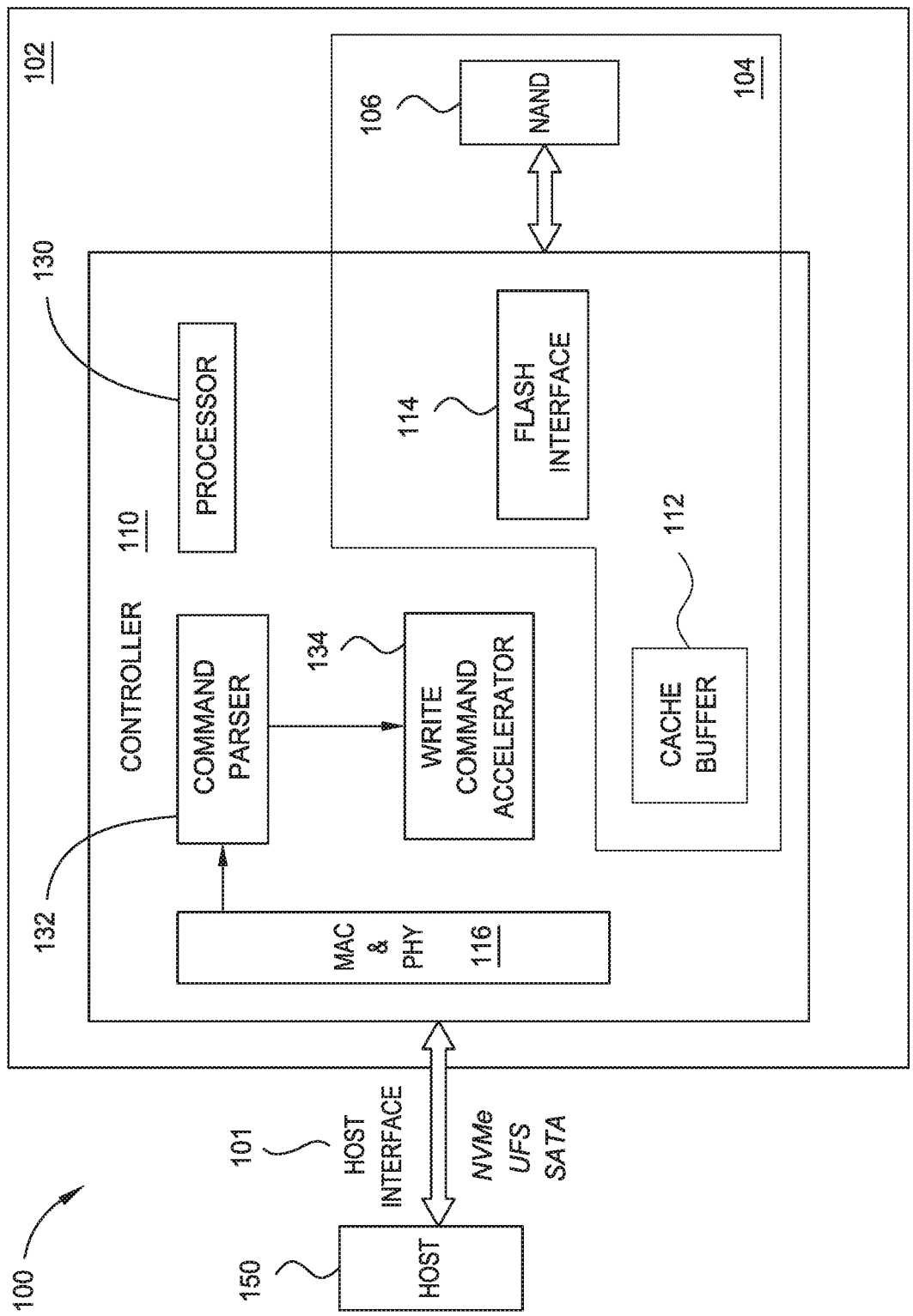
FIG. 1 is a schematic illustration of a storage system including a host and one or more data storage devices, according to one embodiment.

FIG. 1 is a schematic illustration of a storage system 100, according to one embodiment. The storage system 100 includes an initiator or host 150 and one or more target devices, such as a data storage device 102, coupled to the host 150. The data storage device 102 includes a memory 104, which is comprised of both non-volatile and volatile memory. The host 150 utilizes the non-volatile memory (NVM) 106 included in the memory 104 of the data storage device 102 to store and retrieve data. The data storage device 102 may be a removable mass storage device, such as, but not limited to, a handheld, removable memory device, such as a memory card (e.g., a Secure Digital (SD) card, a micro Secure Digital (micro-SD) card, or a MultiMedia Card (MMC)), or a universal serial bus (USB) device. The data storage device 102 may take the form of an embedded mass storage device, such as an eSD/eMMC embedded flash drive, embedded in the host 150.

The host 150 may include a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving). In certain embodiments, the host 150 includes any device having a processing unit or any form of hardware capable of processing data, including a general purpose processing unit (such as a central processing unit (CPU)), dedicated hardware (such as an application specific integrated circuit (ASIC)), configurable hardware such as a field programmable gate array (FPGA), or any other form of processing unit configured by software instructions, microcode, or firmware.

The host 150 interacts with the data storage device 102 through a host interface 101. In certain embodiments, the storage system 100 operates following the non-volatile memory express (NVMe) protocol. In other embodiments, storage system 100 operates following Universal Flash Storage (UFS), serial advanced technology attachment (SATA), serially attached SCSI (SAS), advanced technology attachment (ATA), parallel-ATA (PATA), Fibre Channel Arbitrated Loop (FCAL), small computer system interface (SCSI), peripheral component interconnect (PCI), PCI-express (PCIe), and other suitable protocols.

The NVM 106 of the data storage device 102 is configured for long-term storage of information as non-volatile memory space and retains information after power on/off cycles. In at least one implementation, the NVM 106 consists of one of more dies of NAND flash memory. Other examples of the NVM 106 may include phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in the data storage device 102. Each platter may contain one or more regions of one or more tracks of data.

The data storage device 102 includes a controller 110, which manages operations of the data storage device 102, such as writes to and reads from the NVM 106. The controller 110 interfaces with the host 150 via mac and phy components 116, and interfaces with the NVM 106 though a NVM interface 114. The controller 110 includes a command parser 132 responsible for fetching and parsing commands from the host 150 and queuing the commands internally to a command accelerator 134. The controller 110 includes one or more processors 130, which may be multi-core processors. The processors 130 handle the components of the data storage device 102 through firmware code. The controller 110 further contains logical block addresses (LBA) that are mapped or linked to physical block addresses (PBAs) of the memory elements in the NVM 106, and supports metadata per LBA. Metadata is additional data allocated on a per logical block basis, and may be transferred by the controller 110 to or from the host 150. The host 150 may utilize the metadata to convey end-to-end protection information regarding LBA data.

The memory 104 also includes volatile memory, such as one or more cache buffer(s) 112 included in the controller 110, for short-term storage or temporary memory during operation of data storage device 102. The one or more cache buffers 112 does not retain stored data if powered off. Examples of volatile memories include random access memories (RAM), dynamic random access memories (DRAM), static random access memories (SRAM), and other forms of volatile memories.

Embodiments of the present invention will be discussed in reference to the NVMe protocol, but other protocols are applicable. NVMe is a scalable host controller interface designed to address the needs of enterprise, data center, and client systems. The interface provides an optimized command issue and completion path for SSDs, such as SSDs having the NVM 106 of NAND flash memory. NVMe includes support for enterprise capabilities, such as end-to-end data protection, enhanced error reporting, and virtualization.

FIGS. 2A-2B illustrate embodiments of transferring metadata and LBA data between a data storage device and a host, such as data storage device 102 and host 150 of FIG. 1. FIG. 2A is a schematic diagram 200 of transferring metadata and LBA data between a host 204 and a data storage device 202 having a contiguous buffer 206. Metadata 210 is associated with LBA data 208, and is transferred to and from the host 204 as a contiguous part of the associated LBA data 208. The metadata 210 is transferred at the end of the associated LBA data 208 forming an extended logical block 214. For example, LBAn data 208 associated with LBAn metadata 210 is transferred from the same contiguous buffer 206, such as a contiguous cache buffer 112 of FIG. 1. Similarly, LBAn+1 data 208 associated with LBAn+1 metadata 210 is transferred from the same contiguous buffer 206, such as a contiguous cache buffer 112 of FIG. 1.

FIG. 2B is a schematic diagram 250 of transferring metadata between a host 254 and a data storage device 252 having a data buffer 268 and a metadata buffer 266, according to another embodiment. Metadata 260 is associated with LBA data 258, and is transferred to and from the host 254 separately from the associated LBA data 258. LBA data 258 is stored in the data buffer 268 while the associated metadata 260 is stored in the metadata buffer 266. For example, LBAn data 258 is transferred between the host 254 and the data buffer 268, and associated LBAn metadata 260 is transferred between the host 254 and the metadata buffer 266, such as separate cache buffers 112 of FIG. 1.

The metadata 210, 260 of FIGS. 2A and 2B may optionally include protection information and other general metadata information. The protection information may be evaluated by a controller, such as controller 110 of FIG. 1, to determine the integrity of the associated LBA data. If the protection information is enabled, additional data protection measures are taken when transferring data to and from the host and data storage device.

Figure 3A:
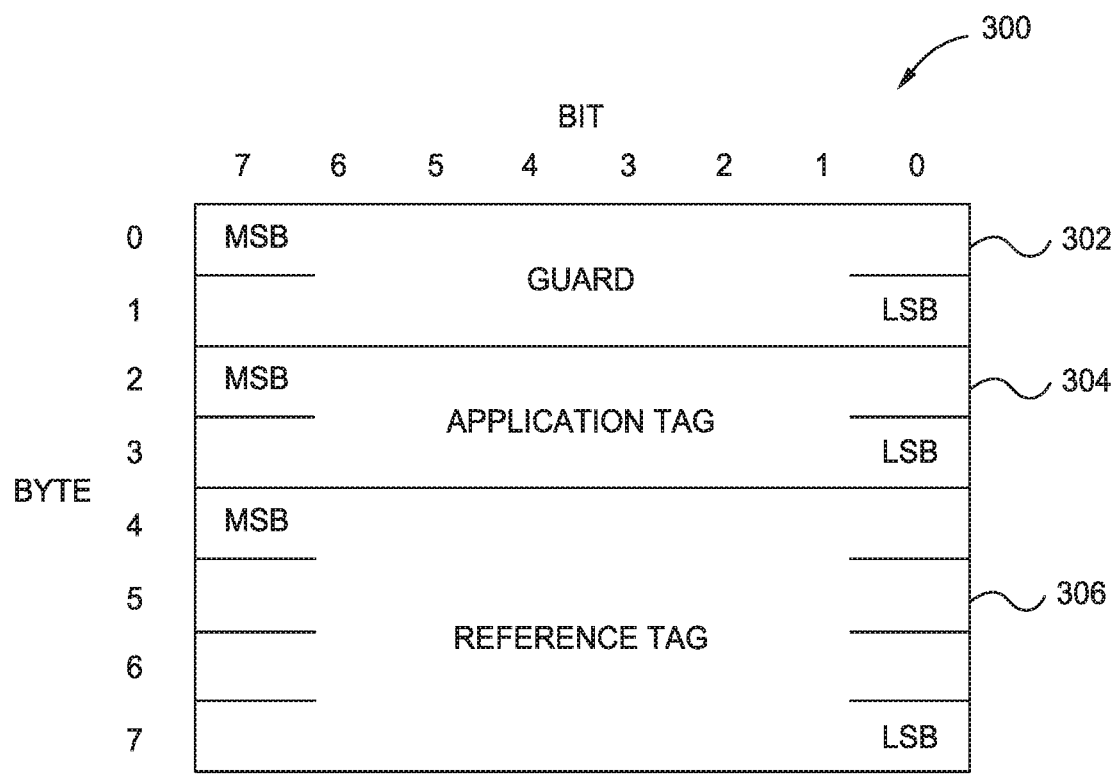
FIG. 3A illustrates a structure of a protection information, according to one embodiment.

FIG. 3A illustrates one embodiment of a structure of a protection information 300 contained in metadata, such as in the metadata 210, 260 of FIGS. 2A and 2B, but other structures and sizes of protection information are possible. The protection information 300 includes a guard field 302 containing cyclic redundancy check (CRC) on the associated LBA data. The protection information 300 further includes an application tag field 304 containing additional checking information, such as a RAID configuration data associated with the LBA data, and includes a reference tag field 306 containing address information. The guard field 302, the application tag field 304, and the reference tag field 306 may each include a most significant bit (MSB) and a least significant bit (LSB).

Figure 3B:
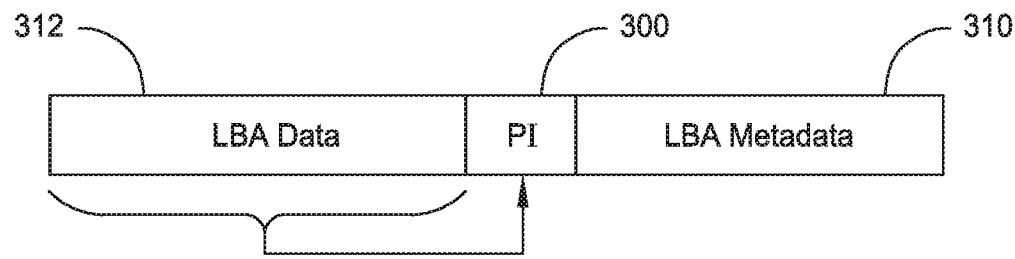
FIGS. 3B-3C illustrate various embodiments of the protection information contained in metadata.
Figure 3C:
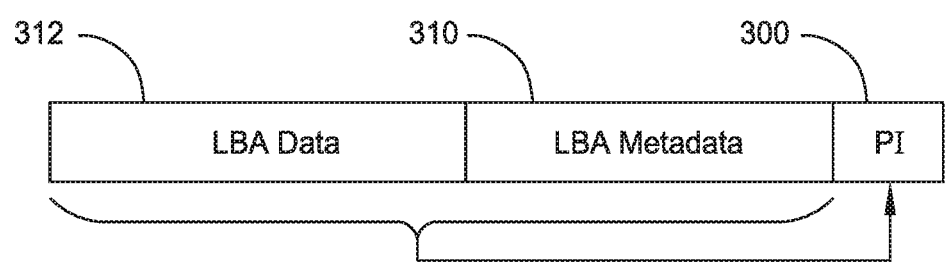

FIGS. 3B-3C illustrate various embodiments of the protection information contained in the metadata. FIG. 3B illustrates the protection information 300 being located at the beginning of the metadata 310 while FIG. 3C illustrates the protection information 300 being located at the end of the metadata 310. As shown in FIGS. 3B-3C, the protection information 300 is proportionally smaller than the LBA data 312. The LBA data 312 may be 512 bytes, while the protection information 300 may be the first 8 bytes of metadata 310 in FIG. 3B, and may be the last 8 bytes of metadata 310 in FIG. 3C. FIGS. 3B and 3C show that the metadata 310 is transmitted as a contiguous part of the LBA data 312, such as in FIG. 2A. In other embodiments, the location of the protection information 300 may be in any location within the metadata 310 and may be contiguous part of the LBA data 312 or a separate part from the LBA data 312.

Figure 4A:
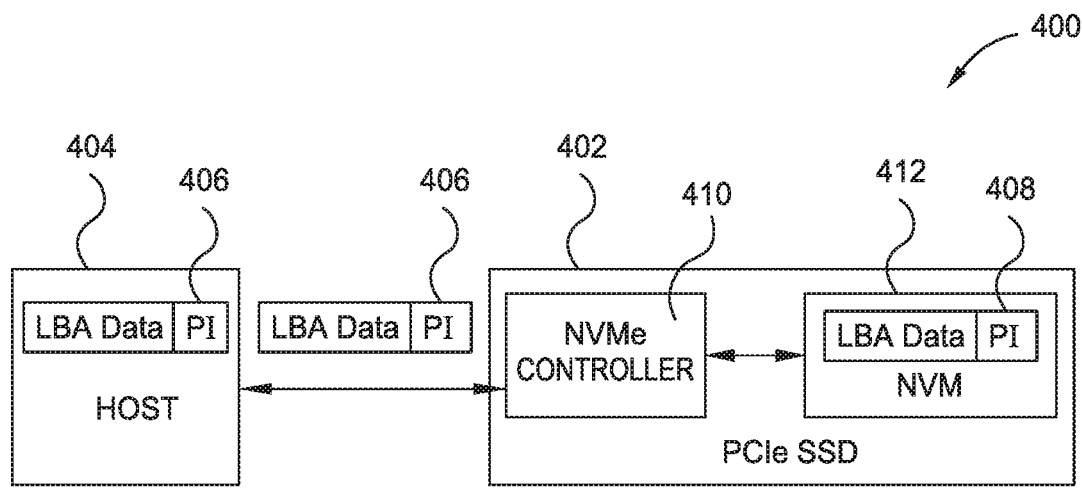
FIGS. 4A-4B illustrate storage systems having end-to-end protection information enabled or disabled in the interface protocol, according to various embodiments.
Figure 4B:
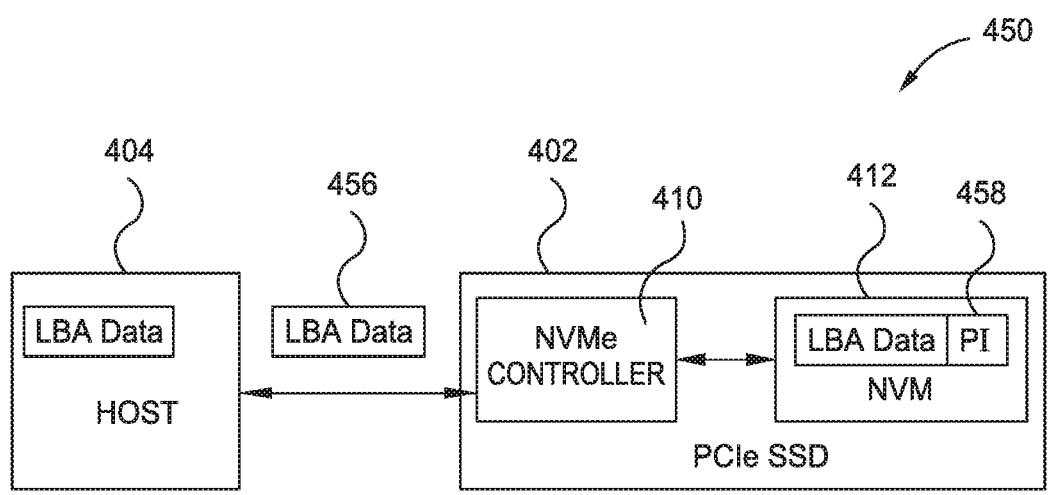

FIGS. 4A-4B illustrate storage systems having end-to-end protection information enabled or disabled in the interface protocol, according to various embodiments. The storage systems 400, 450 of FIGS. 4A and 4B may be the storage system 100 of FIG. 1. The end-to-end protection information 406, 408, 458 may be the protection information 300 of FIG. 3 or within the metadata 210, 260 of FIG. 2. The storage systems 400, 450 of FIGS. 4A-4B include a host 404 and a storage device 402, such as a SSD, having a controller 410 and an NVM 412, which may be the data storage device 102, the controller 110, the NVM 106, and the host 150 of FIG. 1. In at least one implementation, the host 404 and the data storage device 102 operate following NVMe interface protocol.

FIG. 4A illustrates a storage system 400 in which end-to-end data protection information 406, 408 is enabled in the interface protocol, according to one embodiment. When end-to-end data protection information 406, 408 is enabled in the interface protocol, the host 404 contains host protection information 406, and the storage device 402 contains memory protection information 408, which may be stored in the NVM 412 or in cache buffers. The host 404 transfers the LBA data and associated host protection information 406 to the storage device 402. The controller 410 of the storage device 402 may compare the host protection information 406 to the memory protection information 408.

FIG. 4B illustrates a storage system 450 in which end-to-end data protection is disabled in the interface protocol, according to another embodiment. The controller 410 generates and stores memory protection information 458 when storing data to the NVM 412 or to cache buffers, and checks the memory protection information 458 when transferring stored data from the NVM 412 to the host 404. The host 404 transfers LBA data 456 to the storage device 402. The controller 410 of the storage device 402 receives LBA data 456 from the host 404, and generates host protection information based on the LBA data 456 received. The controller 410 may then compare the generated host protection information to the memory protection information 458 stored in the NVM 412. The memory protection information 458 may be the same memory protection information 408 as FIG. 4A.

Figure 5:
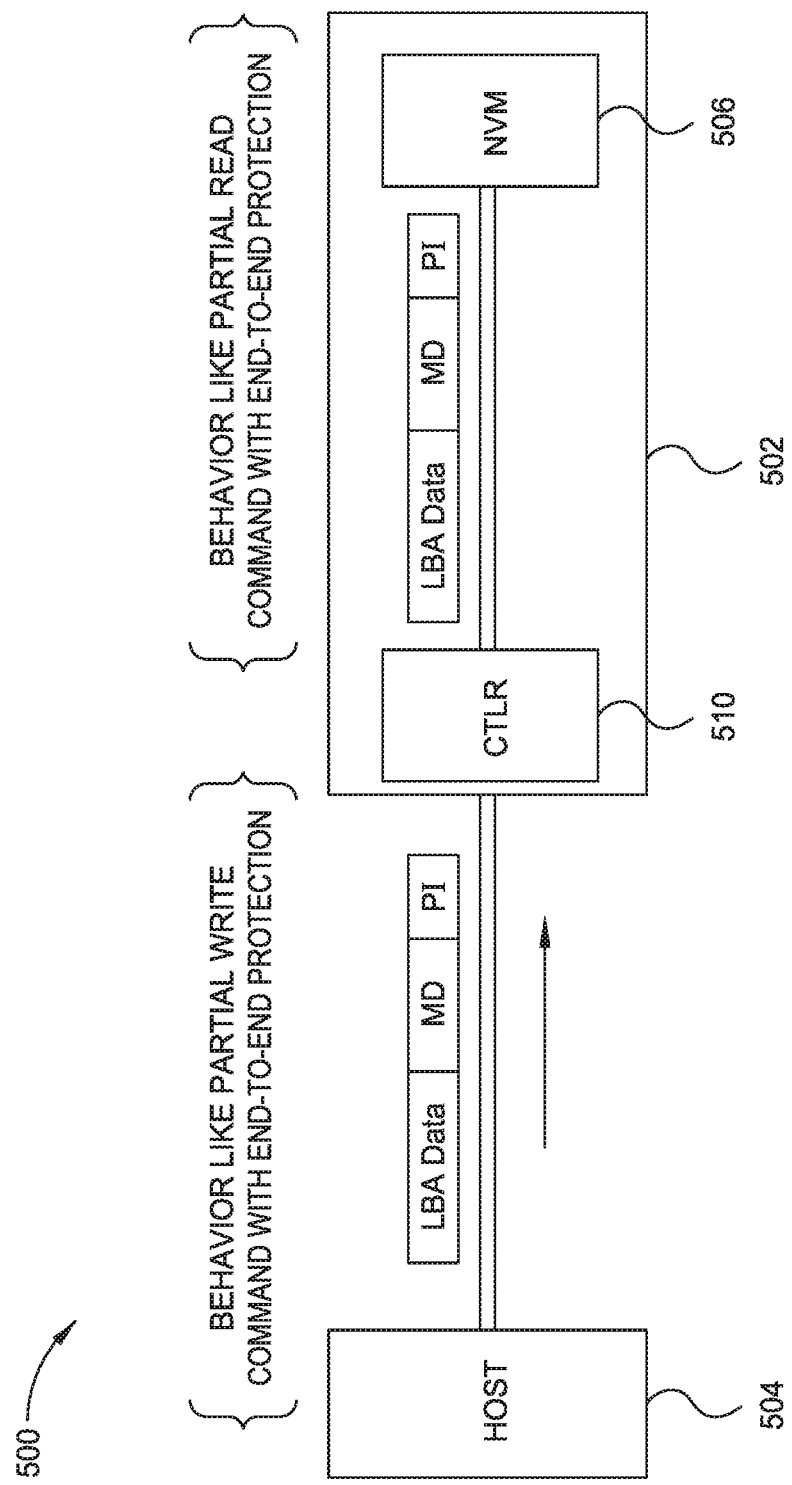
FIG. 5 illustrates a storage system processing protection information in executing a compare command for a storage device and a host device, according to one embodiment.

FIG. 5 illustrates a storage system 500 processing protection information in executing a compare command for a storage device 502 and a host device 504, according to one embodiment. The storage device 502 may include a controller 510 and a NVM 506. The storage device 502, the controller 510, and the NVM 506 may be the data storage device 102, the controller 110, and the NVM 106 of FIG. 1. The host device 504 may be the host 150 of FIG. 1. A compare command may be received from the host device 504 by the storage device 502, and may include the storage device 502 getting, fetching, or receiving logical operation data and/or protection information from the host device 504. In one embodiment, the controller 510 of the storage device 502 first compares the protection information received from the host device 504, such as the host protection information 406 of FIG. 4A, to protection information from a NVM 506 or a cache buffer of the storage device 502, such as the memory protection information 408 of FIG. 4A. If the protection information matches, the controller 510 then compares the logical operation data from the host device 504 and the logical operation data from the NVM 506 or the cache buffer of the storage device 502.

In another embodiment, the host device 504 sends only logical operation data to the storage device 502. The controller 510 of the storage device 502 then generates or calculates host protection information based on the logical operation data received. After generating the host protection information, the controller 510 then compares the generated host protection information to the memory protection information stored in the NVM 506, such as the memory protection information 458 of FIG. 4B. If the protection information matches, the storage device 502 then compares the logical operation data from the host device 504 and the logical operation data from the NVM 506 or the cache buffer of the storage device 502.

Processing of the compare command may cause the storage system 500 to behave like a partial write command and a partial read command. For example, the host device 504 sending the host protection information to the storage device 502 may behave like a partial write command, while the storage device 502 comparing the host protection information and the memory protection information may behave like a partial read command. In certain embodiments, a compare command may be used with or fused with another command. For example, a compare command may be fused with a write command to obtain a lock or reservation on logical unit numbers.

Figure 6:
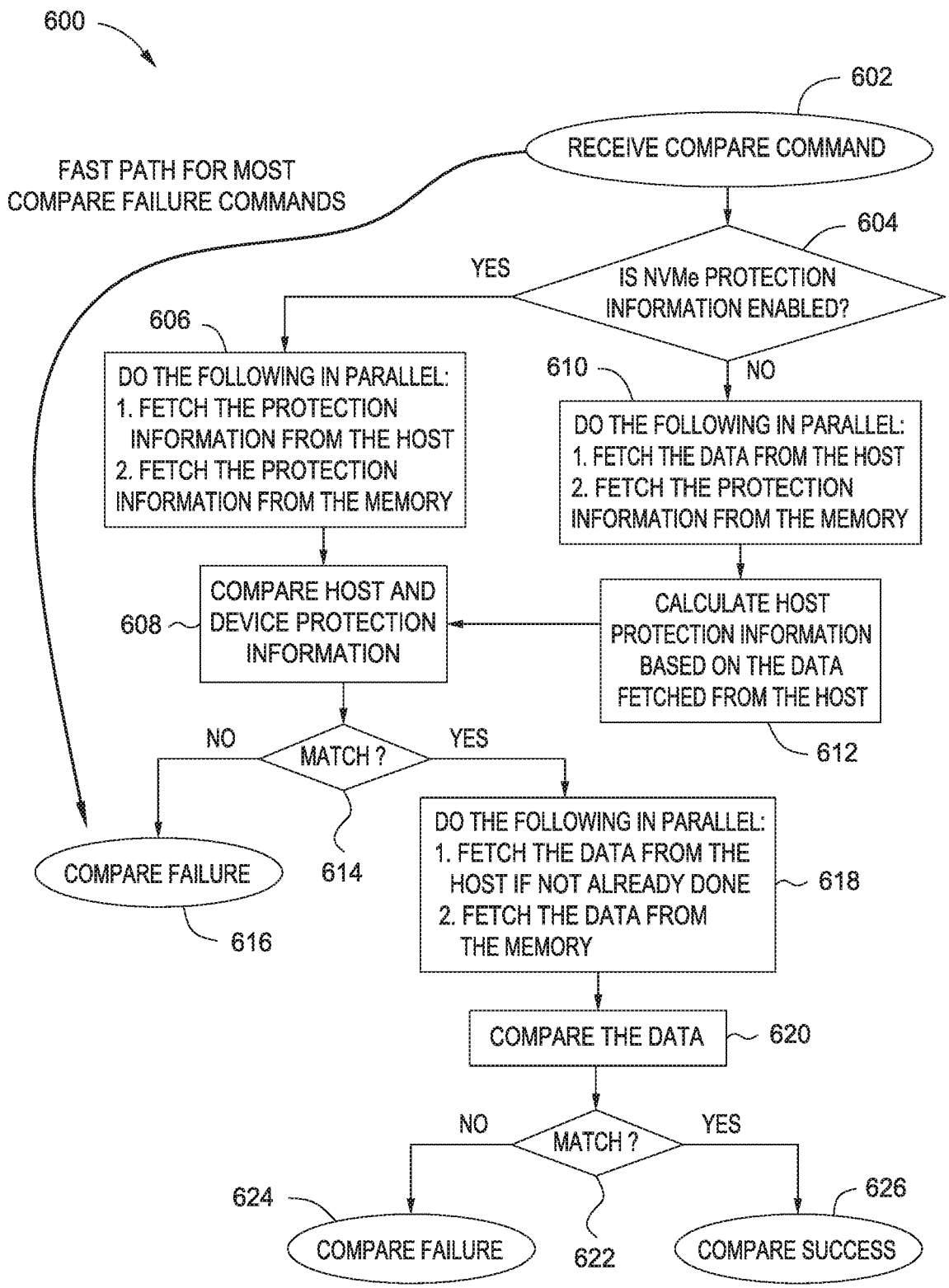
FIG. 6 illustrates a method of executing a compare command, according to one embodiment.

FIG. 6 illustrates a method 600 of executing a compare command, such as the compare command of FIG. 5, according to one embodiment. Method 600 is described in reference to data storage device 102 and host 150 operating as following NVMe protocol. The process may be performed on other systems with other data storage device and host configurations and may be performed on other protocols. One or more operations of method 600 may be performed by the controller 110 executing machine-executable instructions in a non-transitory machine readable medium by a computer, hardware, a processor (e.g., a microprocessor), and/or machine.

In operation 602, the data storage device 102 receives a compare command from the host 150 or fetches a compare command from a host submission queue in the host 150. In at least one implementation, the compare command is an NVMe compare command. In operation 604, the data storage device 102 determines whether protection information is enabled. If end-to-end protection information is enabled, method 600 proceeds to operation 606. If end-to-end protection information is disabled, method 600 proceeds to operation 610.

In operation 606, the data storage device 102 fetches the protection information from the host 150, and the data storage device 102 fetches the protection information from the memory 104 of the data storage device 102, such as the NVM 106 or the cache buffer 112. The protection information may be NVMe protection information. The protection information fetched from the host 150 may be the host protection information 406 of FIG. 4A, and the protection information fetched from the memory 104 may be the memory protection information 408 of FIG. 4A. In at least one implementation, the data storage device 102 fetches the protection information (1) from the host 150 and (2) from the NVM 106 or the cache buffer 112 in parallel to increase the speed of execution. In operation 606, the data storage device 102 only fetches the protection information from the host 150 and from the memory 104 without fetching LBA data from the host 150 or LBA data from the memory 104.

In operation 608, the data storage device 102 compares the protection information fetched in operation 606 from the memory 104 and from the host 150. After comparing the protection information fetched from the memory 104 and from the host 150, the data storage device 102 determines whether the protection information from the memory 104 matches protection information fetched from the host 150 in operation 614. When the protection information from the memory 104 and from host 150 is determined not to match, the data storage device 102 proceeds to operation 616. In operation 616, the data storage device 102 completes execution of the compare command by posting a compare failure to the host 150 or to a completion queue of the host 150. The compare command was executed without the need to fetch host LBA data and without the need to fetch data storage device LBA data.

Since the protection information is proportionally smaller than LBA data, the compare command can be executed quicker, especially in miss-compare scenarios. For example, in reference to FIGS. 2A-2B, the LBA data 208, 258 may be 512 bytes in size and protection information within the metadata 210, 260 may be 8 bytes in size. It is understood that the LBA data and protection information may be any size. Since the protection data size is much smaller than the LBA data, fetching of the protection information is significantly faster than fetching of the LBA data. If the LBA data is fetched from the NVM 106, the fetching time may be further increased since the LBA data may be spread across different physical pages and operations. Completing the compare command by posting a compare failure in which the protection information was compared while avoiding fetching LBA data from the memory 104 of the data storage device 102 and from the host 150 results in a faster completion of the compare command.

When the protection information from the memory 104 and from the host 150 are determined to match in operation 614, method 600 proceeds to operation 618. In operation 618, the data storage device 102 fetches LBA data from the host 150 and fetches LBA data from the NVM 106 or the cache buffer 112 of the data storage device 102. In at least one implementation, the LBA data is fetched from the host 150 and from the NVM 106 or the cache buffer 112 in parallel to increase the speed of execution. In certain instances, user data may have already been fetched from the host 150 in operation 610 as further discussed herein. If the LBA data has already been fetched from the host 150, the data storage device 102 only fetches the LBA data from the NVM 106 or the cache buffer 112 in operation 618.

In operation 620, the data storage device 102 compares the LBA data from the host 150 and from the data storage device 102 fetched in operation 618 and/or operation 610. The data storage device 102 then determines whether the LBA data from the host 150 and the LBA data from the data storage device 102 match in operation 622. When the LBA data from the data storage device 102 and from the host 150 are determined not to match in operation 622, method 600 proceeds to operation 624. In operation 624, the data storage device 102 completes execution of the compare command by posting a compare failure to the host 150 or to a completion queue of the host 150. When the LBA data from the data storage device 102 and from the host 150 are determined to match in operation 622, method 600 proceeds to operation 626. In operation 626, the data storage device 102 completes execution of the compare command by posting a compare success to the host 150 or to a completion queue of the host 150.

If protection information is disabled in the interface protocol, method 600 proceeds from operation 604 to operation 610. In operation 610, the data storage device 102 fetches the LBA data from the host 150 and fetches the protection information from the memory 104 of the data storage device 102, such as the NVM 106 or the cache buffer 112. The protection information fetched from the memory may be the memory protection information 458 of FIG. 4B, and the LBA data fetched from the host 150 may be the LBA data 456 of FIG. 4B.

In operation 612, the data storage device 102 calculates or generates host protection information based on the LBA data from the host 150 fetched in operation 610. Method 600 then proceeds to operation 608 as detailed above. Although end-to-end data protection information is disabled, the data storage device 102 calculates protection information based upon the LBA data from the host 150 fetched in operation 610 so that the generated host protection information may be used and compared in operation 608. Thus, the compare command can still be executed faster than fetching all LBA data, as the LBA data stored in the memory 104 may not need to be fetched and compared. By fetching the LBA data from the host 150, generating host protection information, and comparing the generated host protection information to the memory protection information, the compare command can be executed quicker and more efficiently.

In certain embodiments, the process of performing a compare command is executed faster. In certain embodiments, the process of performing a compare command is completed with better performance and power results.

In certain embodiments, the process may be applied to situations when end-to-end protection information is enabled and when end-to-end protection information is disabled. In certain embodiments, the compare command execution is correlated with protection information even if the end-to-end data protection feature is disabled.

In certain embodiments, comparing protection information may avoid the need for fetching LBA data from the host and from the data storage device in a miss-compare scenario. When protection information is equal or matches, the data storage device may fetch and compare LBA data in a subsequent operation for a no miss-compare scenario.

In certain embodiments, if protection information of host LBA data is not equal to protection information stored in the data storage device, the compare command completes by posting a compare failure regardless whether the LBA data does or does not match. In certain embodiments, protection information is compared first while avoiding the need of fetching LBA data in a miss-compare scenario.

By first comparing host protection information to memory protection information prior to fetching data from the host and from the memory, a compare command can be executed quicker and more efficiently, which results in better performance of a data storage device. The data storage device is able to compare the host protection information to the memory protection information and post a failure notice to the host while avoiding the need of fetching LBA data in a miss-compare scenario. As such, the data storage device is capable of executing high performance and low power compare commands.

In one embodiment, a data storage device comprises a memory comprising a non-volatile memory and one or more cache buffers, and a controller coupled to the memory. The controller is configured to receive a compare command from a host, fetch protection information from the host, fetch protection information from the memory, compare the protection information from the host and the protection information from the memory, and post a failure notice to the host when the protection information from the host and the protection from the memory do not match.

The protection information from the host and the protection information from the memory may be fetched in parallel. The protection information from the memory may be fetched from the non-volatile memory. The protection information from the memory may be fetched from the one or more cache buffers. The controller may be further configured to determine whether protection information is enabled. A host interface may be coupled to the controller.

In another embodiment, a data storage device comprises a memory comprising a non-volatile memory and a cache buffer, and a controller coupled to the memory. The controller is configured to receive a compare command from a host, compare protection information received from the host and protection information received from the memory, determine that the protection information received from the host and the protection information received from the memory match, and post a success notice to the host.

The protection information received from the host may be generated based on data fetched from the host when protection information is disabled. The protection information received from the host may be fetched from the host when protection information is enabled. The controller may be further configured to compare data fetched from the host and data fetched from the memory prior to posting the success notice to the host. The controller may be further configured to determine that the data fetched from the host and the data fetched from the memory match prior to posting the success notice to the host.

In one embodiment, a method of operating a data storage device comprises fetching protection formation from a memory of the data storage device, fetching data from a host, and generating protection information based on the data fetched from the host. The method further comprises comparing the generated protection information and the fetched protection information, and posting a failure notice to the host when the generated protection information and the fetched protection information do not match.

The protection information from the data storage device and the data from the host may be fetched in parallel. The method may further comprise determining protection information is disabled before generating the generated protection information.

In another embodiment, a method of operating a data storage device comprises receiving a compare command, determining protection information is enabled, fetching protection information from a host and from a memory in parallel, and comparing the protection information from the host and the protection information from the memory. The method further comprises fetching data from the host and from the memory in parallel, comparing the fetched data from the host to the fetched data from the memory, and posting a failure notice to the host when the protection information from the host and the protection information from the memory match, and the data from the host and the data from the memory do not match.

The memory may comprise a non-volatile memory, and the data from the memory may be fetched from the non-volatile memory. The memory may comprise a cache buffer, and the data from the memory may be fetched from the cache buffer. The fetching of the protection information from the host and from the memory may occur at a faster speed than the fetching of the data from the host and from the memory. The protection information fetched from the memory may be proportionally smaller in size than the data fetched from the memory, and the protection information fetched from the host may be proportionally smaller in size than the data fetched from the host. The method may further comprise determining the protection information from the host matches the protection information from the memory before fetching the data from the host and the data from the memory.

In another embodiment, a data storage device comprises a non-volatile memory, means for fetching protection information from the non-volatile memory, means for fetching protection information from a host, and means for calculating protection information based on data fetched from the host. The data storage device further comprises means for determining whether the protection information from the host and from the non-volatile memory match, and means for fetching data from the non-volatile memory when the protection information from the host and the protection information from the non-volatile memory are determined to match.

The data storage device may further comprise one or more processors, a memory interface coupled to the non-volatile memory, and a command parser. The data storage device may further comprise means for posting a failure notice to the host when the protection information from the host and the protection information from the non-volatile memory are determined not to match.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory comprising a non-volatile memory and one or more cache buffers;
   a controller coupled to the memory, the controller configured to:
   receive a compare command from a host;
   fetch protection information from the host;
   fetch protection information from the memory, wherein the protection information from the host and from the memory are associated with logical block address (LBA) data, and wherein the protection information from the host and from the memory have a size proportionally smaller than the LBA data;
   compare the protection information from the host and the protection information from the memory; and
   post a failure notice to the host when the protection information from the host and the protection from the memory do not match.

2. The data storage device of claim 1, wherein the protection information from the host and the protection information from the memory are fetched in parallel.

3. The data storage device of claim 1, wherein the protection information from the memory is fetched from the non-volatile memory.

4. The data storage device of claim 1, wherein the protection information from the memory is fetched from the one or more cache buffers.

5. The data storage device of claim 1, wherein the controller is further configured to determine whether protection information is enabled.

6. The data storage device of claim 1, further comprising a host interface coupled to the controller.

7. A data storage device, comprising:
   a memory comprising a non-volatile memory and a cache buffer;
   a controller coupled to the memory, the controller configured to:
   receive a compare command from a host;
   compare protection information received from the host and protection information received from the memory, wherein the protection information received from the host and the protection information received from the memory are associated with logical block address (LBA) data, and wherein the protection information received from the host and the protection information received from the memory have a size proportionally smaller than the LBA data;
   determine that the protection information received from the host and the protection information received from the memory match; and
   post a success notice to the host.

8. The data storage device of claim 7, wherein the protection information received from the host is generated based on data fetched from the host when protection information is disabled.

9. The data storage device of claim 7, wherein the protection information received from the host is fetched from the host when protection information is enabled.

10. The data storage device of claim 7, wherein the controller is further configured to compare data fetched from the host and data fetched from the memory prior to posting the success notice to the host.

11. The data storage device of claim 10, wherein the controller is further configured to determine that the data fetched from the host and the data fetched from the memory match prior to posting the success notice to the host.

12. A method of operating a data storage device, comprising:
   fetching protection formation from a memory of the data storage device;
   fetching data from a host;
   generating protection information based on the data fetched from the host;
   comparing the generated protection information and the fetched protection information, wherein the generated protection information and the fetched protection information are associated with logical block address (LBA) data, and wherein the generated protection information and the fetched protection information have a size proportionally smaller than the LBA data; and
   posting a failure notice to the host when the generated protection information and the fetched protection information do not match.

13. The method of claim 12, wherein the protection information from the data storage device and the data from the host are fetched in parallel.

14. The method of claim 12, further comprising determining protection information is disabled before generating the generated protection information.

15. A method of operating a data storage device, comprising:
receiving a compare command;
determining protection information is enabled;
fetching protection information from a host and from a memory in parallel;
comparing the protection information from the host and the protection information from the memory;
fetching data from the host and from the memory in parallel;
comparing the fetched data from the host to the fetched data from the memory; and
posting a failure notice to the host when the protection information from the host and the protection information from the memory match, and the data from the host and the data from the memory do not match.

16. The method of claim 15, wherein the memory comprises a non-volatile memory, and the data from the memory is fetched from the non-volatile memory.

17. The method of claim 15, wherein the memory comprises a cache buffer, and the data from the memory is fetched from the cache buffer.

18. The method of claim 15, further comprising determining the protection information from the host matches the protection information from the memory before fetching the data from the host and the data from the memory.

19. The method of claim 15, wherein the fetching of the protection information from the host and from the memory occurs at a faster speed than the fetching of the data from the host and from the memory.

20. The method of claim 15, wherein the protection information fetched from the memory is proportionally smaller in size than the data fetched from the memory, and the protection information fetched from the host is proportionally smaller in size than the data fetched from the host.

21. A data storage device, comprising:
a non-volatile memory;
means for fetching protection information from the non-volatile memory;
means for fetching protection information from a host, wherein the protection information from the host and from the non-volatile memory are associated with logical block address (LBA) data, and wherein the protection information from the host from the non-volatile memory have a size proportionally smaller than the LBA data;
means for calculating protection information based on data fetched from the host;
means for determining whether the protection information from the host and from the non-volatile memory match; and
means for fetching data from the non-volatile memory when the protection information from the host and the protection information from the non-volatile memory are determined to match.

22. The data storage device of claim 21, further comprising one or more processors.

23. The data storage device of claim 21, further comprising a memory interface coupled to the non-volatile memory.

24. The data storage device of claim 21, further comprising a command parser.

25. The data storage device of claim 21, further comprising means for posting a failure notice to the host when the protection information from the host and the protection information from the non-volatile memory are determined not to match.

* * * * *